Feb. 4, 1930.  G. A. BRYAN  1,745,401
WATER HEATER
Filed Oct. 15, 1926  2 Sheets-Sheet 1
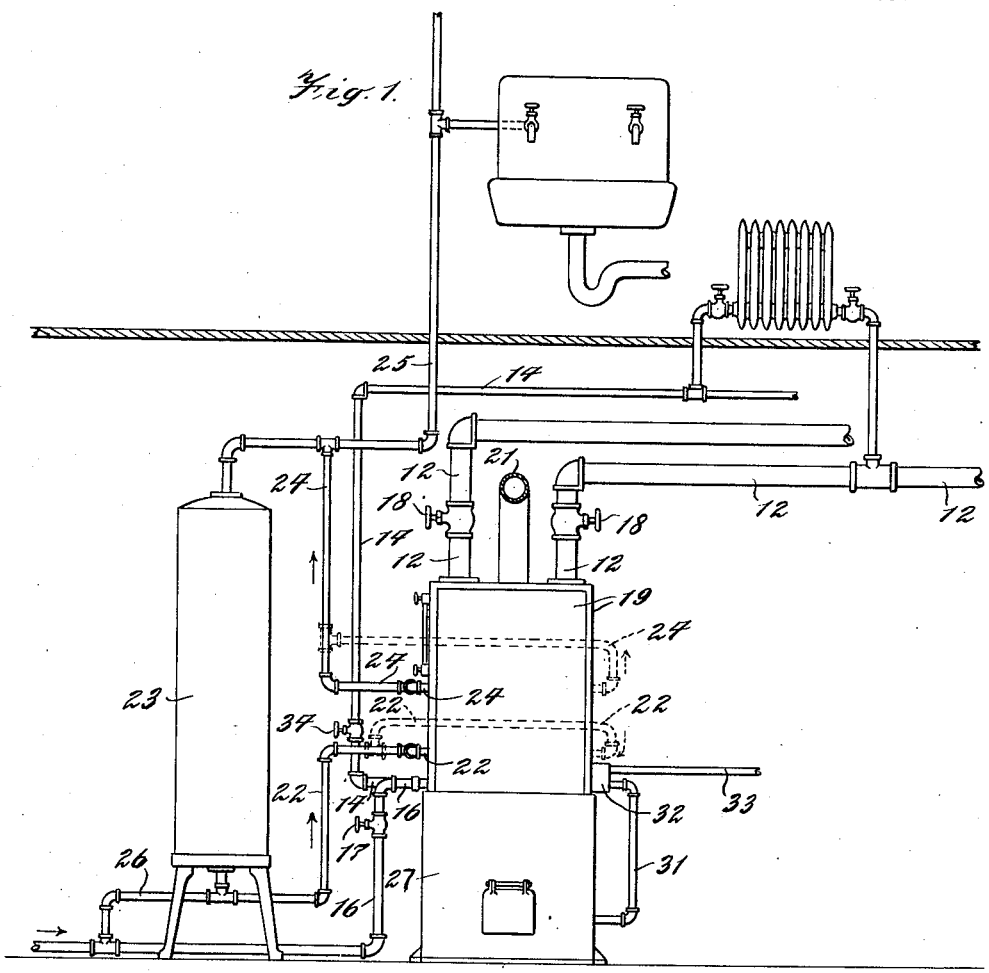
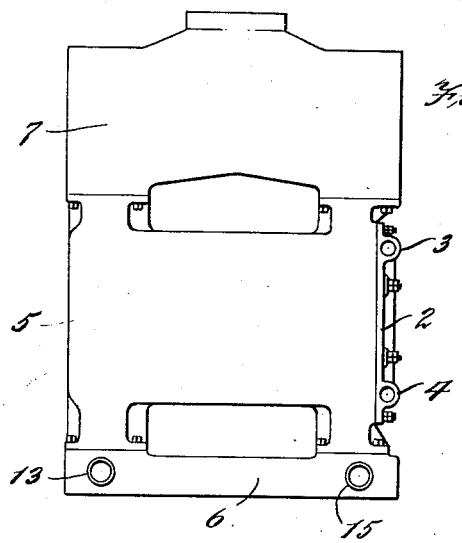
INVENTOR.
George A. Bryan
BY
Stockbridge & Borst
ATTORNEYS Feb. 4, 1930.  G. A. BRYAN  1,745,401
WATER HEATER
Filed Oct. 15, 1926   2 Sheets-Sheet 2
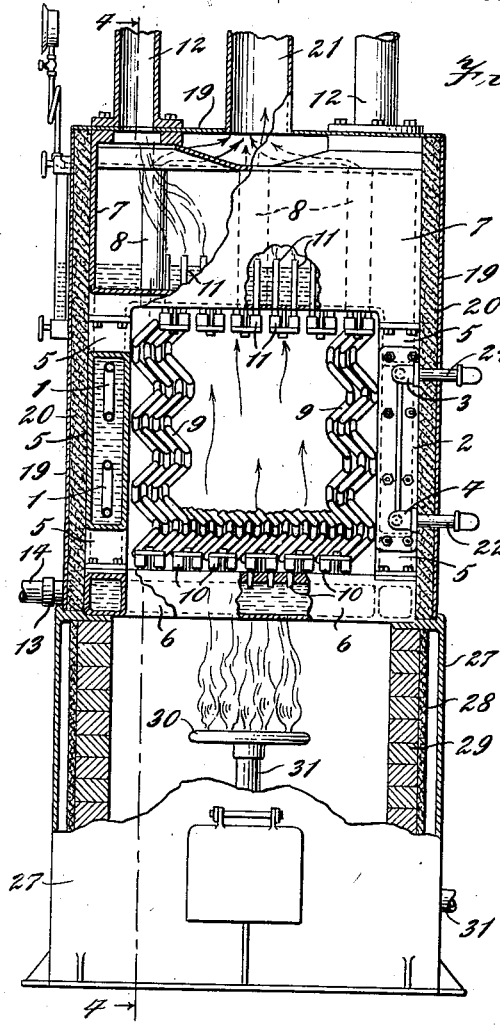
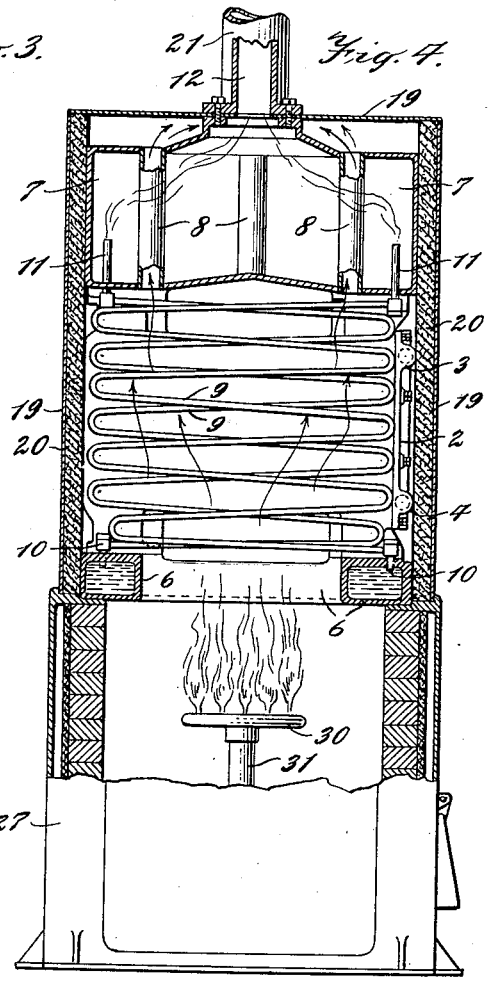
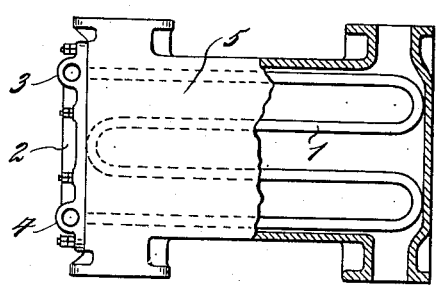
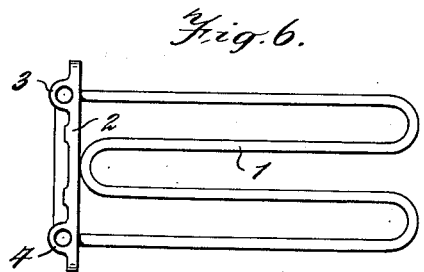
INVENTOR.
George A. Bryan
BY
ATTORNEYS Patented Feb. 4, 1930

1,745,401

UNITED STATES PATENT OFFICE

GEORGE A. BRYAN, OF PERU, INDIANA, ASSIGNOR TO BRYAN STEAM CORPORATION, A CORPORATION OF NEW MEXICO

WATER HEATER

Application filed October 15, 1926. Serial No. 141,786.

In the heating of domestic water supplies, such as for households, it has been a common practice to provide a connection from a storage tank for domestic water to be heated to the household heating plant, by which the water in the storage tank is heated when the heating plant is in use for heating the rooms of the dwelling, such as during the winter time, and to have the storage tank also connected to a separate gas burning water heater for heating the water in the tank whenever the heating plant for the building is not in use, such as during the summer time. Such an installation as this requires considerable plumbing, occupies considerable space and is expensive to install and operate as well as inconvenient. Moreover, the expense of burning gas in the separate water heater during all of the time that the heating plant for the building is not in use is prohibitive, consequently the gas burning heater for the hot water supply is only used occasionally, when there is some special demand for hot water, with the result that the household is without the convenience of a constant supply of hot water during many months of the year. Furthermore, such separate water heaters, by reason of the additional expense involved, together with their only occasional use, commonly have no flue connection and the noxious and deleterious fumes of combustion fill the house.

Objects of the invention are to provide an improved and complete unitary heating apparatus and system which may be used for heating the rooms of the dwelling and also at the same time for heating the domestic water supply, or which may be used for heating the water supply alone for furnishing a supply of hot water twenty-four hours a day throughout the year, which in each instance is inexpensive to operate as well as highly effective, which requires a minimum of or substantially no attention, which is so constructed that the several parts of the apparatus are readily removable for repair or replacement should such eventually be required, and which is compact, durable, dependable, simple and inexpensive in construction. Other objects and advantages will hereinafter appear.

In carrying out the invention I have embodied it in a water tube boiler or steam generator of the type and in some respects of substantially similar construction to that disclosed in my Patent No. 1,497,973, dated June 17, 1924, and in my copending applications for patent Serial No. 490,354, filed August 6, 1921, which became Patent No. 1,672,480, June 5, 1928, and Serial No. 542,204, filed March 9, 1922, which became Patent No. 1,634,351, July 5, 1927. An improved boiler of this type having my present invention embodied therein has been found particularly suitable and effective in accomplishing the objects of this invention.

The invention comprehends various features of construction and combinations of parts, as will appear from the following description.

I shall now describe the illustrated embodiment of my invention and shall thereafter point out my invention in claims, reference now being had to the accompanying drawings, in which:

Fig. 1 is a conventional representation in front elevation of a heating and hot water supply system in which the invention is embodied;

Fig. 2 is an enlarged end elevation of the boiler per se;

Fig. 3 is a front view largely in central vertical section, but with some parts in elevation and others broken away at irregular points, of the complete heating plant or apparatus together with the connections thereto;

Fig. 4 is for the most part a vertical section on the zig-zag line 4—4 of Fig. 3;

Fig. 5 is a side elevation partly in central vertical section of one of the water legs which form the ends of the boiler, having the water heating means for the hot water supply embodied therein; and Fig. 6 is a similar elevation of such heating means per se for the hot water supply.

The water for the hot water supply system is heated in a bent tube 1 which may have several runs and which is shown as having four runs running back and forth horizontally in spaced parallel relation one above another. The water heating tube or conduit 1 is carried by a vertical plate 2 to which it is firmly secured, for example, by welding. The ends of the tube 1, which are at the adjacent ends of the upper and lower runs thereof, open respectively to the outside of the plate 2 through laterally directed upper and lower nipples 3 and 4 formed on the plate 2 near the upper and lower ends thereof. The water heating tube 1 may advantageously be of copper tubing while the plate 2 may be a casting such as iron. The plate 2 forms a removable end closure for one end of a water chamber 5 within and between the opposite ends of which the water heating tube 1 runs back and forth, as shown most clearly in Fig. 5, and this water chamber 5 may be a hollow iron casting. The removable closure plate 2, carrying the water heating tube 1, may be removably secured in place by means of bolts as shown in Figs. 2, 3, 4 and 5. The water chamber 5 forms a removable and replaceable upright water leg in a water tube boiler, two such water chambers being provided, one at each end of the boiler, to form a separable section or end part thereof.

For heating the domestic water supply for relatively large houses containing several families, such as apartment houses and the like, each of the water legs 5 is provided with a water heating tube 1. However, in smaller houses, such as most one-family dwellings, one of the tubes 1 in one of the water legs 5 will prove adequate for heating the water supply. In the latter case the water heating tube 1 is omitted from one of the closure plates 2 and the openings in this plate provided through its nipples 3 and 4 are closed, which may be done either when the plate is cast or subsequently.

Each water leg 5 is provided at its bottom at its respective front and rear ends with flanged tubular downward extensions, as shown, and at its top is similarly provided with tubular flanged upward extensions, for the circulation of the water in the boiler through these legs. The flanged lower extensions of the water leg 5 are removably secured by means of bolts, as shown, on the top and to the adjacent corners of a horizontally disposed continuously tubular rectangular water header or water ring 6 which forms the base of the boiler and which provides through it a large central opening, and this base header may be a single iron casting. This base header 6 at each of its corners on its upper side is provided with an opening through which it communicates with the water legs for the free circulation of water between the base header and the water legs.

A rectangular horizontally arranged upper chamber 7, which in the embodiment of the invention shown is a steam separating chamber, is supported at its corners upon the upper tubular flanged extensions of the water legs 5, which are separably secured thereto by means of bolts, as shown, and which communicates therewith through openings provided in the bottom of the upper chamber 7. This upper boiler chamber or steam separating chamber 7 may also be an iron casting. The water level therein is maintained somewhat above the bottom or floor thereof, as shown in Fig. 3, and may be indicated by a usual water gauge as shown in Figs. 1 and 3. A number of vent tubes 8 pass up through this upper boiler chamber 7 for the escape of the gaseous products of combustion from the heating chamber which is formed below the upper chamber 7 and between the water legs 5.

Two sets of closely adjacent bent water tubes or steam generating tubes 9 run back and forth across the heating chamber as shown in Fig. 4, these tubes being disposed in zig-zag relation, as appears in Fig. 3. The lower ends of these boiler tubes carry nipples 10 which enter the top of the base header or water ring 6 at the front and rear of the boiler for the respective sets of the tubes. The upper ends of these tubes 9 carry longer nipples 11 which enter the bottom of the separating chamber 7 at the front and rear thereof for the respective sets of tubes and which project upwardly above the water level for the free escape of steam, as shown in Figs. 3 and 4. These nipples 10 and 11 are removably clamped in place so that any individual boiler tube 9 may be removed from the boiler, from the front for one set of tubes and from the rear for the other set of tubes, merely by unclamping its nipples. These water tubes 9 may be advantageously made from copper tubing.

The top wall of the steam separating chamber 7 is bulged upwardly at its ends, as shown in Figs. 2, 3 and 4, to form small steam domes provided at their tops with steam outlets and to which are respectively connected take-off lines or delivery pipes 12 for conveying the steam through the building for use and to which radiators may be connected, as shown in Fig. 1. The water ring or base header 6 is provided with an inlet nipple 13 (Fig. 2) to which a water return line or pipe 14 from the radiators is connected, as shown in Figs. 1 and 3. The water ring 6 is provided with a second nipple 15 for the entrance of feed water, to which is connected a cold water feed pipe 16 provided adjacent the boiler with a usual valve 17, which is kept closed excepting at such times as it may be necessary to replenish the water in the boiler. A usual pressure indicator or steam gauge is provided for the steam separating chamber 7 as shown in Fig. 3. Each of the main steam pipes 12 has therein adjacent to the steam supplying chamber 7 a valve 18 which is left open at times when it is desired to use the radiators for heating purposes, such as in the winter time, and at other times, when the radiators are not to be used, such as in the summer time, these valves 18 are kept closed.

The entire boiler, excepting at the bottom of the water ring 6, is provided with an outer sheet metal jacket 19 which at the front, rear and ends of the boiler is provided with a thick lining 20 of suitable heat insulating material such as sheet asbestos. The jacket 19 provides, above the steam separating chamber 7, a small reception chamber or smoke box for the products of combustion rising through the vent tubes or pipes 8, this latter chamber being formed around the steam domes, and a flue or chimney stack 21 is connected to the top of the jacket 19. The jacket 19 together with its asbestos lining 20 forms a complete enclosure for the heating chamber of the boiler at the front, rear and both ends. The front and rear walls of this closure may be removable for gaining ready access to the water tubes 9.

Each of the lower nipples 4 for the water heating tube 1 has a pipe connection 22 to the bottom of a usual upright water storage tank 23, while each of the upper nipples 3 has a similar pipe connection 24 to the top of this tank. In Fig. 1 these pipe connections 22 and 24 to the respective sets of nipples 4 and 3 are shown for one of these sets of nipples in broken lines thereby to indicate that one of these connections may be omitted if desired in cases where one of the water heating tubes 1 would serve the purpose, as has been hereinbefore mentioned, and the storage tank 23 in such case may be of a smaller size.

The water in the heating tubes 1 is heated by a transfer of heat from the heated water in the water legs or water chambers 5 by which the tubes 1 are surrounded. According to well understood principles, water will circulate through each of the tubes 1, passing out through the upper nipple 3 and through the pipe connection 24 to the top of the water tank 23, while the cold water from the bottom of the tank will pass through the pipe connection 22 and lower nipple 4 into the tube 1 there to be heated. A usual hot water delivery pipe 25, for supplying hot water throughout the building, is also connected to the top of the storage tank 23, while a cold water pipe 26 for replenishing the tank has a connection to the bottom thereof, all as shown in Fig. 1.

The entire boiler is supported upon the top of a suitable furnace or fire box shown as comprising an outer casing 27, which may be of cast iron, an asbestos lining 28 spaced from the walls of the casing 27 and an inner lining 29 of fire bricks. The furnace may be fired by means of either gas or liquid fuel as desired and for this purpose a burner 30 is shown to which is connected a fuel supply pipe 31. I have found that the boiler shown in the drawings as an embodiment of my invention operates with high efficiency and economy when a suitable oil is used for the fuel. Any suitable oil burner may be employed and, as is well understood, the oil may be sprayed into the combustion chamber or it may first be vaporized in any suitable way. For example, a vaporizing tube (not shown) may be located in the lower part of the heating chamber between the runs of the water tubes 9, substantially as disclosed in my above noted Patent No. 1,634,351. However, in the embodiment of the invention shown in the drawings it may be assumed that the liquid fuel is sprayed into the combustion chamber by means of the burner 30.

A thermostat 32 is in control of the fuel supply and is shown (Fig. 1) as located in close adjacency to the water ring or base header 6 so as to be effectively subjected to the heat thereof. A main fuel supply pipe 33 is connected to this thermostat and the burner pipe 31 is shown as leading therefrom. The thermostat 32 may be of any suitable construction, and in view of the fact that such devices are well known it is considered desirable for the sake of simplicity to omit the details thereof. I have found a desirable manner of operation to be to have the thermostat 32 operate to shut off entirely the supply of fuel to the burner when the water in the base ring 6 reaches a desired predetermined maximum temperature, and to permit the passage of fuel again when such water has cooled to a predetermined minimum temperature. With this arrangement any suitable means may be provided for reigniting the fuel at the burner 30 such, for example, as the usual pilot light (not shown).

This automatic thermostatic control is of particular utility and convenience when the heating equipment or system for the building, such as the radiators, are not in use over extended periods of time, such as during the summer months. During such times the main steam valves 18, provided in the steam supply mains 12 near the boiler, are kept closed, as is also a valve 34 in the water return pipe 14 adjacent to the boiler, so that thereby the boiler as a whole, but to the exclusion of the water heating conduits or tubes 1, is closed upon itself. In such case if it be assumed, for example, that the burning fuel at the burner 30 will raise the temperature of the water in the boiler to 190 degrees in fifteen minutes and that the burner is then automatically shut off, the hot water in the closed boiler, by reason of the fact that the boiler is well insulated, will remain hot enough for several hours to continue to transfer sufficient heat to the water heating tubes 1 for effectively heating the water therein, the combustion of fuel under the boiler being automatically restored before the water in the boiler has cooled sufficiently to be ineffective as a means for heating the water for the hot water supply equipment or system, thereby rendering a supply of hot water available at all times and without requiring attention. Furthermore, it has been found that this manner of operation in heating water for the home effects a large economy over the usual separate gas heater, so that there is a considerable saving in expense when the boiler of my invention is thus used for heating the household water supply alone, as well as when it is used for heating the rooms of the dwelling, and this has been found to be particularly the case when oil is used for fuel.

It is therefore to be noted that a supply of hot water is continuously available at all times, winter and summer, throughout the day and night, regardless of whether or not the heating equipment for the building is in use. It may be further noted, as a matter of convenience and comfort as well as health, that the house heating means or radiator system may be put into use at any time over short periods such as on chilly or damp days such as commonly occur in the spring and fall, as well as at times during the summer. It is also to be noted that in carrying out my invention, a single unitary compact heating apparatus or heating plant is provided, without any extraneous appurtenances or separate parts, whereby hot water may be had at all times and heat for the rooms whenever desired.

It is obvious that various modifications may be made in the construction shown in the drawings and above particularly described, within the principle and scope of my invention as defined in the appended claims.

I claim:

1. In a boiler, the combination of a water leg constituting a separable upright side section of the frame of the boiler through which the water circulates and having one of its ends open, and a unitary water heater sealing said opening and comprising a plate fitted and secured over the opening and having two passages therethrough, and a coiled pipe carried by the inner face of the plate and extending into the water leg with its two ends communicating with the passages.

2. In a boiler, the combination of a water leg constituting a separable upright side section of the frame of the boiler through which the water circulates and having one of its ends open, and a unitary water heater sealing said opening and comprising a plate fitted and secured over the opening and having two passages therethrough, a coiled pipe carried by the inner face of the plate and extending into the water leg with its two ends communicating with the passages, and two attaching nipples on the outer face of the plate constituting portions of the respective passages and providing attaching means for external pipes.

3. The invention defined in claim 1, in which the said water leg has flat spaced walls and the said coiled pipe has serpentine coils arranged flatwise between the said walls.

In witness whereof, I hereunto subscribe my signature.

GEORGE A. BRYAN.